United States Patent [19]

Bramstedt et al.

[11] Patent Number: 4,730,550
[45] Date of Patent: Mar. 15, 1988

[54] PISTON CUP AND CYLINDER ASSEMBLY

[75] Inventors: David A. Bramstedt; Thomas R. Hetzel, both of Sheboygan; Charles E. LaBelle, Oostburg, all of Wis.

[73] Assignee: Thomas Industries, Inc., Louisville, Ky.

[21] Appl. No.: 18,813

[22] Filed: Feb. 20, 1987

Related U.S. Application Data

[63] Continuation of Ser. No. 763,952, Aug. 8, 1985, abandoned.

[51] Int. Cl.⁴ .................. F16J 9/08; F04B 39/10
[52] U.S. Cl. .................... 92/240; 417/299; 417/571; 137/521; 137/855
[58] Field of Search ............ 417/299, 555 R, 559, 417/565, 571, 447; 92/240–245; 137/517, 520, 521, 855

[56] References Cited

U.S. PATENT DOCUMENTS

| 609,185 | 8/1898 | Goss | 92/240 X |
|---|---|---|---|
| 1,338,765 | 5/1920 | Brandt | 92/240 |
| 2,647,683 | 8/1953 | Schweller | 417/571 |
| 2,836,474 | 5/1958 | Mosher | 92/240 |
| 3,062,601 | 11/1962 | Sadler et al. | 92/240 |
| 3,606,588 | 9/1971 | Romerhaus | 417/299 X |
| 3,961,869 | 6/1976 | Droege, Sr. et al. | 417/555 R |
| 3,998,571 | 12/1976 | Falke | 417/569 |
| 4,028,015 | 6/1977 | Hetzel | 417/555 R |
| 4,230,149 | 10/1980 | Worthen et al. | 137/855 X |
| 4,275,999 | 6/1981 | Hetzel et al. | 417/550 X |
| 4,537,566 | 8/1985 | Blass et al. | 417/569 |
| 4,540,352 | 9/1985 | Becker | 417/571 |
| 4,642,037 | 2/1987 | Fritchman | 417/571 |

FOREIGN PATENT DOCUMENTS

| 487498 | 4/1918 | France | 137/521 |
|---|---|---|---|
| 205328 | 12/1983 | German Democratic Rep. | 417/559 |
| 752324 | 7/1956 | United Kingdom | 92/245 |
| 790795 | 2/1958 | United Kingdom | 92/244 |

Primary Examiner—Carlton R. Croyle
Assistant Examiner—Paul F. Neils
Attorney, Agent, or Firm—Emrich & Dithmar

[57] ABSTRACT

A seal and retainer assembly for an air compressor piston includes a cup-shaped seal with its marginal edge extending at an angle relative to the cylinder wall, the seal having a notch extending circumferentially at the base of its marginal edge defining a hinge which allows pivoting of the marginal edge relative to the main body portion of the seal which is clamped to the piston. A head plate includes an air intake port for communicating the compression chamber with an air inlet and a discharge port for communicating the compression chamber with a compressed air discharge outlet, each of the ports having a flexible spring closure member cooperating with an inclined valve seat to allow the ports to be open whenever the compressor is shut off.

7 Claims, 11 Drawing Figures

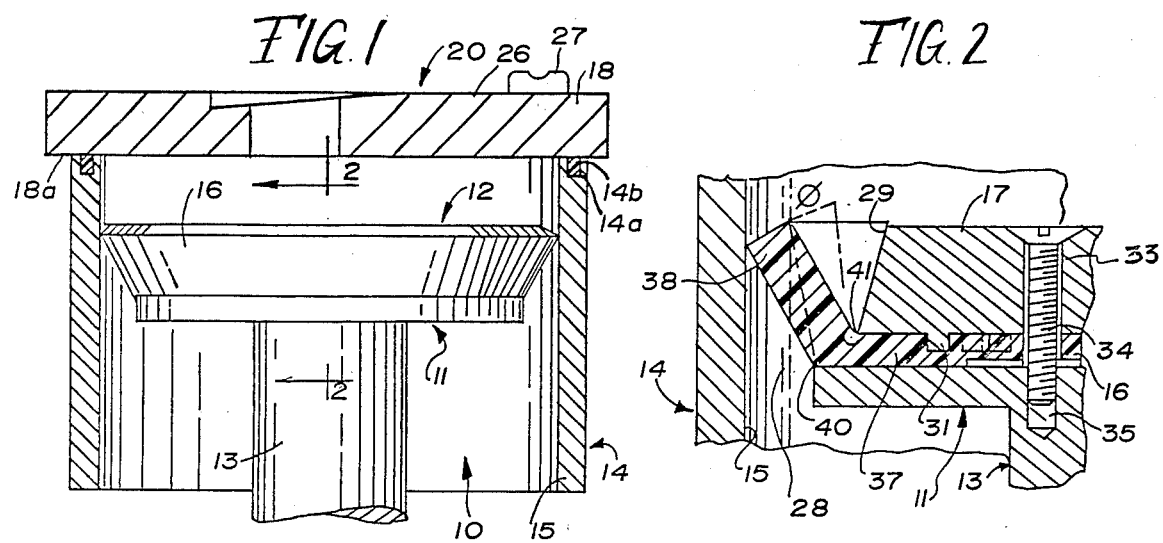
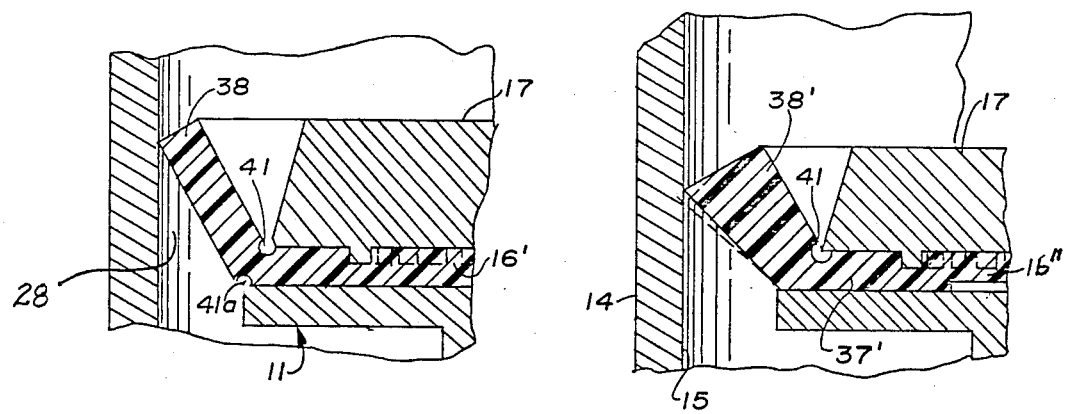
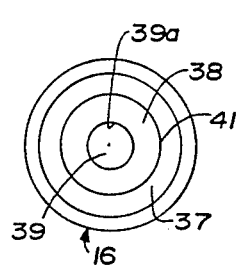
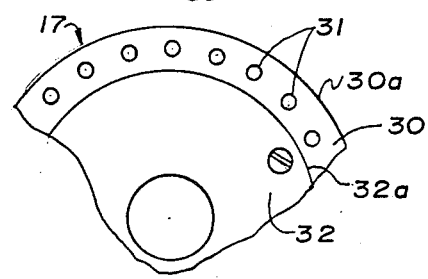

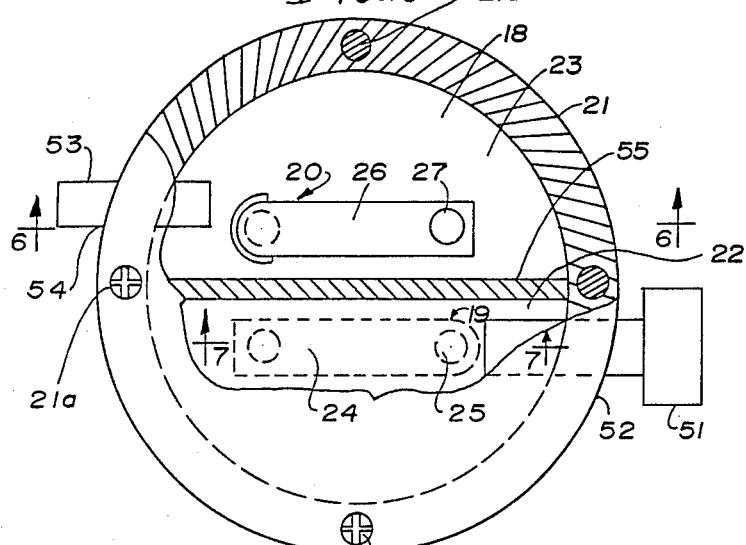
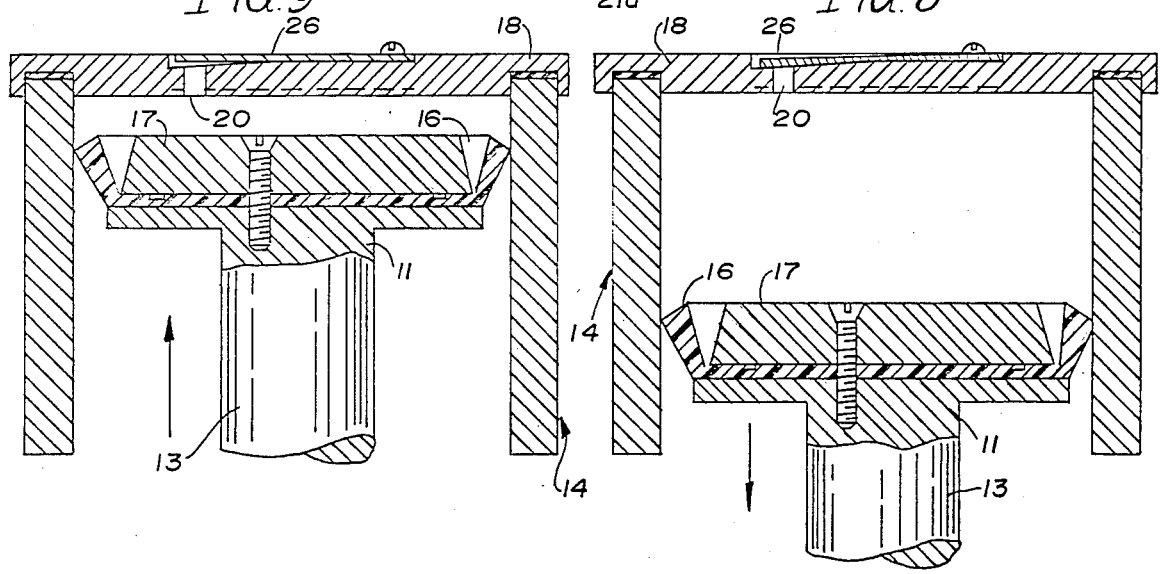
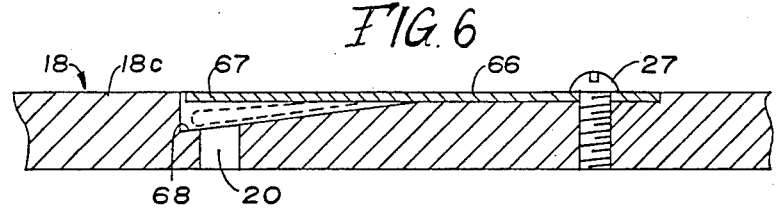
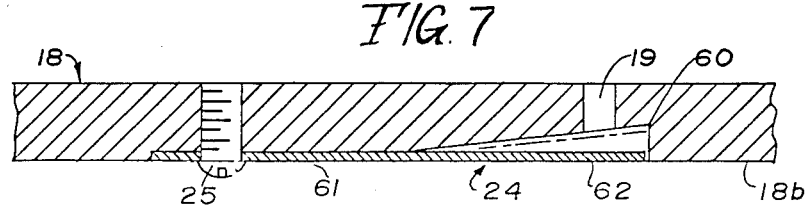

PISTON CUP AND CYLINDER ASSEMBLY

This is a continuation of application Ser. No. 763,952, filed Aug. 8, 1985 now abandoned.

BACKGROUND OF THE INVENTION

This invention relates to air compressors, or like apparatus, and in particular to piston and cylinder assemblies for such apparatus.

In U.S. Pat. No. 4,275,999, which is assigned to the assignee of the present invention, there is disclosed an air compressor which employs a wobble piston with a unitary flanged filled Teflon disc or cup which serves both as a guide for the wobble piston and as a pneumatic seal of the piston to the wall of the cylinder in which it moves. The working surface of the cylinder has a hardened polished surface, providing a smooth surface for cooperating with the filled Teflon seal of the piston. A plate secures the seal to the piston for holding down the seal. The seal has a radially extending portion and an axially extending portion extending normal to each other, the outer surface of the axially extending portion engaging the polished inner wall of the cylinder and moving therealong as the piston is driven to provide the seal between the piston and the cylinder wall.

In this sealing arrangement, the sealing member moves generally tangential in providing a seal between the cylindrical piston and cylindrical wall. In time wear on the seal member will result in loss of seal, necessitating replacement of the seal. The lifetime of the sealing member is particularly reduced when employed with a wobble piston which exhibits rocking motion as well as reciprocating motion. In such application, sufficient clearance must be provided between the piston and the cylinder to allow rocking motion of the piston. The sealing member must continuously fill the space provided between the piston and the cylinder wall for maintaining a proper operation. Compression of the sealing member between the piston (or seal retainer) and the cylinder wall with rocking motion of the piston greater shortens the lifetime of the sealing member.

The piston contains a flexible intake valve through which the compression cylinder is loaded on the piston downstroke with a charge of air which is then trapped by the intake check valve on the upstroke of the piston. The compressor also includes a discharge check valve in its cylinder head which opens on the upstroke of the piston to receive the compressor delivery and closes on the piston downstroke to prevent backward flow from the discharge chamber into the cylinder.

The intake valve is in the form of a flexible thin spring metal planar closure strip which is stationarily fixed at one end but inclined at a small angle to the planar seat provided about the piston intake port. Such a valve closure strip is capable of flexing outwardly on the downstroke of the piston to admit a charge of air into its compression chamber and its snugly engages the valve seat on the compression stroke so that maximum quantity of the captured charge of air is delivered into the receiving chamber thereof.

However, the inclined valve seat allows the valve closure strip to come to rest at a position spaced off the surrounding valve seat each time that the compressor is halted. The uncovered intake port vents the compression chamber so that on startup there is an equalization of pressure inside and outside the cylinder. While such arrangement results in reduction in the torque requirement of the piston drive motor so that the compressor can be easily started and restarted, the requirement of a valved port in the piston makes for a complicated piston structure with an attendant high cost to manufacture.

SUMMARY OF THE INVENTION

It is a general object of the invention to provide an improved compressor unit.

Another object of the invention is to provide an improved seal and retainer for piston assemblies.

Yet another object of the invention is to provide a compressor unit having a piston and cylinder assembly which is of simplified construction and low cost.

The present invention provides a compressor having means defining a fluid intake chamber and a compressed fluid discharge chamber and including a plate member closing said compression chamber at one end thereof and means defining a compression chamber, having an intake port through which fluid from said intake chamber is admitted into the compression chamber and discharge port through which compressed fluid from the compression chamber is discharged into the discharge chamber, a first check valve which closes the intake port and a second check valve which closes the discharge port, motor-driven means in said compression chamber which cyclically opens the intake port valve to charge the compression chamber with fluid and then to open the discharge port valve to discharge said fluid through the discharge port, the intake port valve closing as the discharge port valve opens, each of said intake and discharge ports having a surrounding planar valve seat formed in said plate member and its associated check valve embodying a planar closure strip of thin, flexible spring metal having one end stationarily fixed to said plate member with its free end overlying the planar valve seat about the associated port, each said closure strip in its unflexed stage assuming a planar disposition with its free end disposed over its planar valve seat and inclined at an angle to the plane thereof, said closure strip being capable of flexing in response to the cyclic movement of the motor-driven means to open and close its port during operation of the compressor, and, in the halted state of the compressor, to assume its planar disposition such that its port is open to facilitate start and restart of the compressor.

In accordance with another aspect of the invention, a seal and retainer assembly for a piston adapted for movement within a cylinder comprises an annular sealing member having a radially extending portion and an axilly extending portion, the radially extending portion having an inner edge surface defining a central aperture for the sealing member; a retainer member generally disc shaped having a peripheral edge which overlies the upper surface of a portion of said radially extending portion of said sealing member; and means for securing said retainer member to said piston with said portion of said radially extending portion of said sealing member clamped between said edge portion of said retainer member and said piston and with said axially extending portion extending freely outwardly at an obtuse angle relative to said radially extending portion and engaging the cylinder wall to provide a seal between the piston and the cylinder wall; a circumferential portion of said sealing member at the junction of said radially and axially extending portions being cut away providing at least one notch defining a hinge portion for said sealing member permitting said free axially extending portion to move pivotally relative to said clamped radially extending portion as said piston is driven within said cylinder.

In accordance with a feature of the invention, the retainer has a plurality of downwardly projecting bosses spaced along its periphery, the bosses engaging the radially extending portion of the sealing member when the sealing member and retainer are assembled on the piston.

In accordance with a further feature, the axially extending portion of the sealing member increases in thickness from its base to its outer edge defining a working area of increased thickness.

DESCRIPTION OF THE DRAWINGS

FIG. 1 is a transverse sectional view showing a piston assembly of the present invention mounted thereon;

FIG. 2 is an enlarged fragmentary sectional view taken substantially as indicated by line 2—2, FIG. 1;

FIG. 2A is an enlarged sectional view showing another embodiment of the piston sealing member;

FIG. 2B is an enlarged fragmentary sectional view showing a further embodiment of the piston sealing member;

FIG. 3 is a top plan view of the sealing member of FIG. 2,

FIG. 4 is a fragmentary bottom plan view of the retainer;

FIG. 5 is a top plan view of the compression head, partially cut away to show the intake and discharge chambers of the compressor, and the cylinder head plate mounted therein;

FIG. 6 is a fragmentary sectional view of the cylinder head plate taken along the line 6—6 of FIG. 5;

FIG. 7 is a fragmentary sectional view of the cylinder head plate taken along the line 7—7 of FIG. 5;

FIG. 8 is a sectional view of the compressor cylinder with the piston in the downstroke position; and, FIG. 9 is a sectional view of the compression cylinder with the piston in the upstroke position.

DESCRIPTION OF PREFERRED EMBODIMENTS

With reference to FIG. 1 of the drawings, there is shown a piston assembly indicated generally at 10, provided in accordance with the invention. As shown in FIG. 1 the piston assembly 10 includes a piston head 11, and a piston seal and retainer assembly 12. The piston 11 is attached to an operating shaft or piston rod indicated generally at 13 which is coupled to a suitable piston drive (not shown). The piston assembly is shown positioned within a cylinder 14 having an inner cylindrical surface 15 against which an annular sealing member 16 of the seal and retainer assembly 12 is adapted to be slidably operable. A retainer plate 17 (FIG. 2) of the piston seal and retainer assembly 12 secures the sealing member 16 to the piston head 11. The top of the cylinder 14 is closed by a cylinder head 21 (FIG. 5), which is supported by a support plate 18 which defines valved inlet and outlet ports 19 and 20, respectively in accordance with a further aspect of the invention.

By way of example, the piston assembly 10 may be used in a compressor unit such as that disclosed in the above-referenced U.S. Pat. 4,275,999. As described therein, the compressor comprises a housing which encloses a motor and defines crank case which has a hollow vertical neck in which extends the piston and the cylinder, and which opens at its lower end into the crank case wherein the piston rod is coupled to the drive motor shaft. A support plate is fixed in a horizontal position on the neck of the housing and enclosed by a cylinder head in the form of an inverted cup-like shaped member which defines a discharge chamber for the compressor.

With reference to FIGS. 1 and 5, in the present application, the support plate which is indicated at 18, is generally circular in shape and has its peripheral edge 18a resting on the top edge of the cylinder 14 which is formed with an annular groove 14a which locates a suitable seal 14b, such as an O-ring. The edge 18a of the support plate which support the cylinder head 21 are clamped to the top edge of the neck as by machine screws 21a (FIG. 5). The sealing means 14b shown may be disposed in a groove in the support plate 18 rather than in the neck portion of the cylinder.

The support plate 18 defines a valved intake port 19 and a valved discharge port 20 (FIG. 5) both of which communicate with the compression cylinder 14. The cylinder head 21 defines an air inlet chamber 22 which communicates with the intake port 19 and a discharge chamber 23 which communicates with the discharge port 20. Flow through the intake port 19 is governed by a spring strip check valve 24 fastened by a screw 25 to the lower surface 18b of the support plate 18. Similarly, flow through the discharge port 20 is governed by a further spring strip check valve 26 which is fastened by a screw 27 to the upper surface 18c of the support plate 18.

A drive mechanism (not shown) drives the lower end of the piston rod 13, causing rocking and reciprocating motion of the piston head 11 which rides up and down in the cylinder 14. The sealing member 16 both guides the rocking piston in its movement and provides a seal between the cylinder wall and the piston. As the piston moves down, the intake port 19 is opened, drawing air into the cylinder compression chamber through the intake port 19. As the piston head 11 moves up, the air is compressed and forced out through the discharge port 20. The continuous sealing afforded by sealing member 16, as the piston moves to and fro within the cylinder, enhances drawing of air into the compression cylinder during the downward stroke as well as compression of the air during the upward stroke of the piston head 11.

The piston seal and retainer assembly 12 of the present invention is shown and described in connection with one type of piston and one form of cylinder is an air compressor, by way of example only, and the piston seal and retainer assembly 18 may be applied to provide a movable seal in other assemblies of reciprocating elements.

With reference to FIGS. 1 and 2, the piston head 11 is generally disc-shaped with the piston rod 13 formed integrally therewith. The outer diameter of the piston head 11 is less than the inner diameter of the cylinder 14 defining a gap 28 therebetween. The retainer plate 17, which is generally disc-shaped, includes a bevelled edge 29 in a flange 30 (FIG. 4) that extends circumferentially outward from the hub or center portion 32 of the retainer plate 17. The retainer plate 17 defines a plurality of generally cylindrical bosses 31, extending downwardly from the flange 30. Although twenty-four bosses 31 are shown and are illustrated as being cylindrical in shape, other shapes and numbers of such bosses could be employed. Three apertures, such as aperture 33 shown in FIG. 2, are provided to facilitate attachment of the retainer plate 17 to the piston head 11, with a portion of the sealing member 16 sandwiched therebetween, as by machine screw 34 which engages the tapped hole 35 in the top of the piston head 11.

As shown in FIGS. 2 and 3, the sealing member 16 is formed with a radially extending portion 37, a generally axially portion 38 extending at an obtuse angle relative to the radial portion 37, and a central aperture 39 of a diameter less than the diameter of the hub portion 32 of the retainer member 17. The sealing member 16 may be made from any suitable flexible material having a relatively low coefficient of friction. A material of this type is commonly known as "Teflon"; however, other materials with like properties may be utilized herein without departing from the spirit of the invention.

The radially extending portion 37 of the sealing member 16 is adapted to be disposed in a slot 40 formed between the piston 11 and the flange 30 of the retainer plate and to be retained therein by means of compression of retainer plate and the piston 11. The hub 32 of the retainer plate engages the inner edge 39a of the central aperture 39 of the sealing member 16, to the center the sealing member 16 on the piston head 11. The bosses 31 on the peripheral edge of the retainer plate 17 grip the radial extending portion of the sealing member 16, biting into the sealing member 16 to hold the sealing number 16 in place as the piston moves up and down.

A portion of the sealing member 16 is cut away at the junction of the radial portion 37 and the axial portion 38 defining an annular notch 41. The decreased cross sectional area in the proximity of the junction of the radial portion 37 and axial portion 38 defines a hinge, permitting hinged movement of the axial portion 38 relative to the radial portion 37 of the sealing member 16.

The cylinder 14 is of aluminum with a hardened polished inner surface 15. The Teflon sealing member 16 and polished cylinder 14 are self-lubricating, the inner surface 15 of the cylinder providing a smooth, long life wearing surface for cooperating with the outer edge 42 of the sealing member 16 of the piston assembly.

The outer periphery of the retainer plate 17 is bevelled as at 29 with its lower tip 42 located at the hinge portion of the sealing member at the notch 41. The marginal edges of the sealing member 16 tend to spring out radially to maintain contact with the inner wall 15 of the cylinder 14 with movement of the piston through its various positions. The retainer plate 16 by virtue of its bevelled edge 29 also urges the axially extending portion 38 of the sealing member 16 toward the inner wall surface 15 of the cylinder 21, to aid in maintaining the outer edge 42 in continuous sealing engagement therewith. The retainer plate 17 urges the axially extending portion of the seal 16 radially outwardly into contact with the inner surface 15 of the cylinder 14, pivoting it about its hinge portion defined by the notch 41.

To increase the hinged movement of the axially extending portion 38, the sealing member may be provided with an additional notch 41a as illustrated for the embodiment of the sealing member 16' illustrated in FIG. 2A. The additional notch 41a is provided at the bottom edge. The provision of two diametrically opposed notches 41 and 41a reduces the amount of material, increasing hinging type movement of the sealing member as the piston 11 is driven.

Referring to FIG. 2B in accordance with a further embodiment, the axial portion 38' of the sealing member 16" is provided with a bevel shape to increase the amount of material in the work or end portion of the sealing member 16" which engages the inner wall 15 of the cylinder 14. This configuration enhances the useable life time of the sealing member 16.

Referring to FIG. 2, when the sealing member 16 and retainer plate 17 are assembled on the piston head 11, the radially extending portion 37 overlies the peripheral edge of the piston head 11, and the bosses 31 of the retainer plate 17 engage the radially extending portion 37 on its upper surface. The downwardly projecting hub 32 of the retainer plate 17 extends through the central aperture 39 of the sealing member 16 and rests on the upper surface of the piston head 11. Thus, when the retainer plate 17 is secured to the piston head 11 by machine screws 34, the peripheral edge surface 32a of the hub 32 engages the inner surface 39a of the sealing member central aperture, centering the sealing member 16 on the piston head 11. In addition, the bosses 31 grippingly engage the radially extending portion 37, biting into the upper surface thereof due to the relatively small surface area of the tips of the bosses 31.

The bevelled edge 29 urges the axially extending portion 38 of the sealing member 16 outwardly, driving its outer or working edge 42 into engagement with the inner surface 15 of the cylinder 14 as the piston 11 is driven. On forward or generally upward strokes, the working edge 42 of the sealing member axially extending portion 38 binds on the cylinder wall surface 15, hingedly moving outwardly relative to the radially extending portion 37 increasing the angle $\phi$ therebetween. On the reverse or downward stroke of the piston, the axially extending portion 38 pivots inwardly relative to the radially extending portion 37, decreasing the angle $\phi$ therebetween. This hinged movement enables the sealing member to adapt to the cylinder wall and to be urged into a tight engagement therewith during the forward piston stroke.

Referring now to FIG. 5, considering the cylinder head assembly in more detail, the intake port 19 communicates with atmosphere through an air inlet filter 51 which extends through the side wall at 52 of the cylinder head 21. As indicated hereinabove, valved intake port 19 communicates the intake chamber 22 with the interior of the compression cylinder 14.

The discharge port 20 communicates with a discharge outlet 53 through the side wall at 54 of the cylinder head 21. The valved discharge port 20 communicates the interior of the compression cylinder 14 with the discharge outlet 53. The cylinder head 21 has an internal wall 55 extending between diametrically opposed points in its side walls and generally parallel to the spring members 24 and 26, dividing the interior of the cylinder head 21 into two compartments defining the inlet chamber 22 and the discharge chamber 23. Suitable sealing means, (not shown) is disposed between the bottom edge of the cylinder head and top surface of the support plate 18 to provide an air tight seal when the cylinder head 21 and the support plate 18 are assembled together on the compressor housing.

As indicated above, the intake port 19 through the head plate 18 includes a valve seat 60 (FIG. 7) which is closed by spring valve member 24, which is in the form of a metal strip closure plate. The intake valve closure strip 24 comprises a thin flexible spring metal strip tensioned to retain its illustrated planar disposition although yieldable in response to developing pressure exerted thereto in operation of the compressor. The closure strip 24 has a fixed end 61 and a free end 62. The fixed end 61 is stationarily fixed to the lower surface 18b of the head plate 18 by screw 25 so that in the halted state of the compressor, the free end of the strip 62 extends generally horizontal and/or normal to the axis of the cylinder 14 and its valve seat 60. The intake port valve seat 60 is recessed below the surface of the support plate 18.

The discharge port 20 has air flow therethrough governed by the discharge strip valve 26 which is also a thin flexible spring metal strip which is tensioned to retain its normal horizontally extending disposition but yieldable in response to pressure exerted thereto during operation of the compressor. As illustrated in FIGS. 5 and 6, the valve strip member 26 has a fixed end 66 and a free and 67. The fixed end 66 is fixed to the top surface 18c of the support plate 18 by screw 27 and the free end 67 extends generally horizontal and normal to the axis of the cylinder 14. The discharge port 20 is surrounded by a planar valve seat 68 which is recessed below the top surface of the head plate 18.

Referring to FIG. 6, the valve seat 68 is inclined at a small angle, for example, 5 to 7 degrees relative to the horizontal. The valve strip member 26 is shown in its at rest position in FIG. 6 with its free end extending generally horizontal and spaced above the inclined or ramped valve seat 68. Thus, when the compressor is off, the interior of the compression cylinder 14 is communicated with the discharge outlet through the discharge port 20. During the downstroke of the piston, the free end 67 of the valve strip member 26 is flexed down, as shown by the dashed line to engage the valve seat 68, closing the discharge port. During the upstroke, the compressed air drives the free end 67 off the seat 68.

Similarly with reference to FIG. 7, the valve seat 60 of the intake port 19 may also be inclined at a 5 to 7 degree angle so that in its at rest position, the intake valve closure strip 24 extends generally horizontal and its free end 62 is spaced above the inclined or ramped valve seat 60 so that the compression chamber interior of the cylinder is communicated with the inlet chamber through the inlet valve port 19. During the downstroke, the free end 62 of strip member 26 is drawn away from the valve seat 60, and in the upstroke, the free end 62 is driven into engagement with the valve seat 60, as shown by the dashed line in FIG. 7, to close the inlet port 19. Each time the compressor motor is halted and the compressor piston comes to rest, the compressor is readied for start up by return of the intake valve closure strip 24 to its at rest position in which position, the compression cylinder 14 is vented to atmosphere. Thus, on start up of the compressor, the torque requirements of the motor are minimal because of the qualization of the pressure within the cylinder 14 with the outside atmosphere through which the piston moves in response to energizing of its drive motor.

With reference to FIGS. 7 and 8, in operation of the compressor, on the downstroke of the piston 11, air is drawn through inlet filter 51 in the chamber 22 and through the inlet port 19, moving the free end 62 of strip member 24 away from valve seat 50, and passing through the port into the compression chamber of the cylinder 14 as the piston 24 moves in its downstroke. In addition, the free end 67 of the discharge strip valve 26 is drawn downward into engagement with its valve seat 68, closing the discharge port 20.

On the upstroke of the piston (FIG. 9), the free or outward end 62 of the intake closure member 24 is loaded by the compressed charge of air collected within the cylinder between the piston and the underside of the cylinder head support plate 18 so that end 62 firmly engages its valve seat 60 which surrounds the intake port 19. As the pressure collected in the cylinder 14 increases with the rise of the piston 11 within the cylinder 14, the discharge check valve closure strip 26 is flexed away from the valve seat 68 of the discharge port 20, allowing the compressed air therethrough into the discharge chamber 23 for delivery through the discharge outlet 53.

We claim:

1. A seal and retainer assembly for a piston adapted for movement within a cylinder having a cylinder wall, comprising:

an annular sealing member having a radially extending portion and an axially extending portion, the radially extending portion having an inner edge surface defining a central aperture for the sealing member;

a retainer member generally disc shaped having a peripheral edge portion which overlies the upper surface of a portion of said radially extending portion of said sealing member, the diameter of said retainer member being less than the diameter of the piston by an amount corresponding to the thickness of said axially extending portion of said sealing member, said retainer member including gripping means projecting substantially downwardly from said peripheral edge portion for engaging said upper surface of said radially extending portion of said sealing member; and means for securing said retainer member to said piston with said portion of said radially extending portion of said sealing member clamped between said edge portion of said retainer member and said piston and with said axially extending portion extending freely outwardly and engaging the cylinder wall to provide a seal between the piston and the cylinder wall;

said gripping means of said retainer member including a plurality of downwardly projecting bosses spaced along the periphery of its edge portion, said bosses engaging corresponding grooves in the upper surface of said radially extending portion of said sealing member when said sealing member and retainer member are assembled together.

2. A seal and retainer assembly for a piston adapted for movement within a cylinder having a cylinder wall, comprising:

an annular sealing member having a radially extending portion and an axially extending portion, the radially extending portion having an inner edge surface defining a central aperture for the sealing member;

a retainer member generally disc shaped having a peripheral edge portion which overlies the upper surface of a portion of said radially extending portion of said sealing member, the diameter of said retainer member being less than the diameter of the piston by an amount corresponding to the thickness of said axially extending portion of said sealing member; and means for securing said retainer member to said piston projecting substantially downwardly from said peripheral edge portion for engaging said radially extending portion of said sealing member with said portion of said radially extending portion of said sealing member clamped between said edge portion of said retainer member and said piston and with said axially extending portion extending freely outwardly at an obtuse angle relative to said radially extending portion and engaging the cylinder wall to provide a seal between the piston and the cylinder wall;

and a circumferential portion of said sealing member at the junction of said radially and axially extending portions cut away providing a first notch, and a further circumferential portion of said sealing member cut away at the junction of said radial and axial portions providing a second notch located diametrically opposed to said first notch, said notches defining a hinge portion for said sealing member, permitting said free axially extending portion to move pivotally relative to said clamped radially extending portion as said piston is driven within said cylinder.

3. A seal and retainer assembly for a piston adapted for movement within a cylinder having a cylinder wall, comprising:

an annular sealing member having a radially extending portion and an axially extending portion, the radially extending portion having an inner edge surface defining a central aperture for the sealing member;

a retainer member generally disc shaped having a bevelled peripheral edge portion which increases in diameter from top to bottom and which overlies the upper surface of a portion of said radially extending portion of said sealing member, the diameter of the bottom of said retainer member being less than the diameter of the piston by an amount corresponding to the thickness of said axially extending portion of said sealing member; and means for securing said retainer member to said piston projecting substantially downwardly from said peripheral edge portion for engaging said radially extending portion of said sealing member with said portion of said radially extending portion of said sealing member clamped between said edge portion of said retainer member and said piston and with said axially extending portion extending freely outwardly at an obtuse angle relative to said radially extending portion and engaging the cylinder wall to provide a seal between the piston and the cylinder wall;

and a circumferential portion of said sealing member at the junction of said radially and axially extending portions cut away providing a first notch, and a further circumferential portion of said sealing member cut away at the junction of said radial and axial portions providing a second notch located diametrically opposed to said first notch, said notches defining a hinge portion for said sealing member, permitting said free axially extending portion to move pivotally relative to said clamped radially extending portion as said piston is driven within said cylinder.

4. The seal and retainer assembly according to claim 3, wherein said axially extending portion of said sealing member increases in thickness from its base to its outer edge defining a working area of increased thickness.

5. The seal and retainer assembly according to claim 3, wherein said retainer member has a downwardly extending central hub of a diameter corresponding to that of said central aperture of said sealing member which is received in said central aperture when said retainer member is assembled with said sealing member.

6. A seal and retainer assembly for a piston adapted for movement within a cylinder having a cylinder wall, comprising:

an annular sealing member having a radially extending portion and an axially extending portion, the radially extending portion having an inner edge surface defining a central aperture for the sealing member;

a retainer member generally disc shaped having a peripheral edge portion which increases in diameter from top to bottom and which overlies the upper surface of a portion of said radially extending portion of said sealing member, the diameter of the bottom of said retainer member being less than the diameter of the piston by an amount corresponding to the thickness of said axially extending portion of said sealing member, said retainer member including gripping means projecting substantially downwardly from said peripheral edge portion for engaging said upper surface of said radially extending portion of said sealing member; and means for securing said retainer member to said piston with said portion of said radially extending portion of said sealing member clamped between said edge portion of said retainer member and said piston and with said axially extending portion extending freely outwardly at an obtuse angle relative to said radially extending portion and engaging the cylinder wall to provide a seal between the piston and the cylinder wall;

said gripping means of said retainer member including a plurality of downwardly projecting bosses spaced along the periphery of its edge portion, said bosses engaging corresponding grooves in the upper surface of said radially extending portion of said sealing member when said sealing member and retainer member are assembled together;

and a circumferential portion of said sealing member at the junction of said radially and axially extending portions being cut away providing at least one notch defining a hinge portion for said sealing member permitting said free axially extending portion to move pivotally relative to said clamped radially extending portion as said piston is driven within the cylinder.

7. A seal and retainer assembly for a rocking rod piston adapted for movement within a compression cylinder having a cylinder wall, the outer diameter of the piston being less than the inner diameter of the compression cylinder, comprising:

an annular sealing member of a flexible material having a radially extending portion and an axially extending portion, the radially extending portion having an inner edge surface defining a central aperture for the sealing member;

a retainer member generally disc shaped having a downwardly extending central hub portion and a peripheral edge portion, the diameter of said hub portion corresponding to that of said central aperture of said sealing member and when said retainer member is assembled on said sealing member, the hub portion extends through said central aperture of said sealing member and its peripheral edge portion overlies the upper surface of said radially extending portion of said sealing member, the outer diameter of said retainer member corresponding to the outer diameter of the radially extending portion of said sealing member whereby its peripheral edge terminates at the junction of said radially and axially extending portions; and means for securing said retainer member to said piston projecting substantially downwardly from said peripheral edge portion for engaging said radially extending portion of said sealing member, with said radially extending portion of said sealing member clamped between said peripheral edge portion of said retainer member and said piston and with said axially extending portion extending freely outwardly at an obtuse angle relative to said radially extending portion and having a radial working end with a corner edge engaging the cylinder wall to provide a generally ring-shaped point of contact seal between the piston and the cylinder wall; and a circumferential portion of said sealing member at the junction of said radially and axially extending portions being cut away providing a first notch, and a further circumferential portion of said sealing member cut away at the junction of said radial and axial portions defining a second notch located diametrically opposed to said first notch, said notches defining a hinge portion for said sealing member permitting the working end of said axially extending portion to bind on the inner surface of the cylinder wall to move pivotally relative to said clamped radially extending portion as said piston is driven within said cylinder.

* * * * *